UNITED STATES PATENT OFFICE.

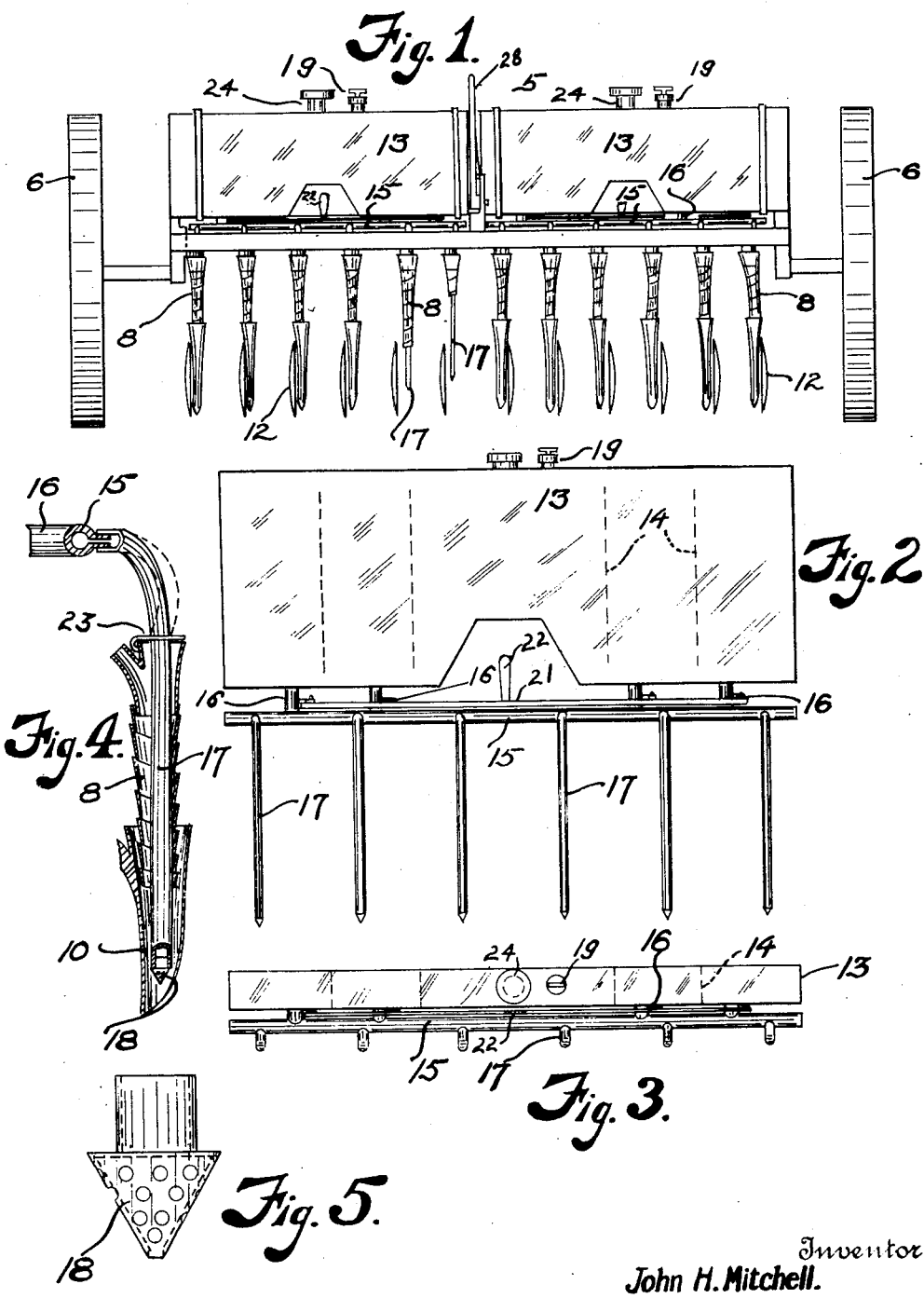

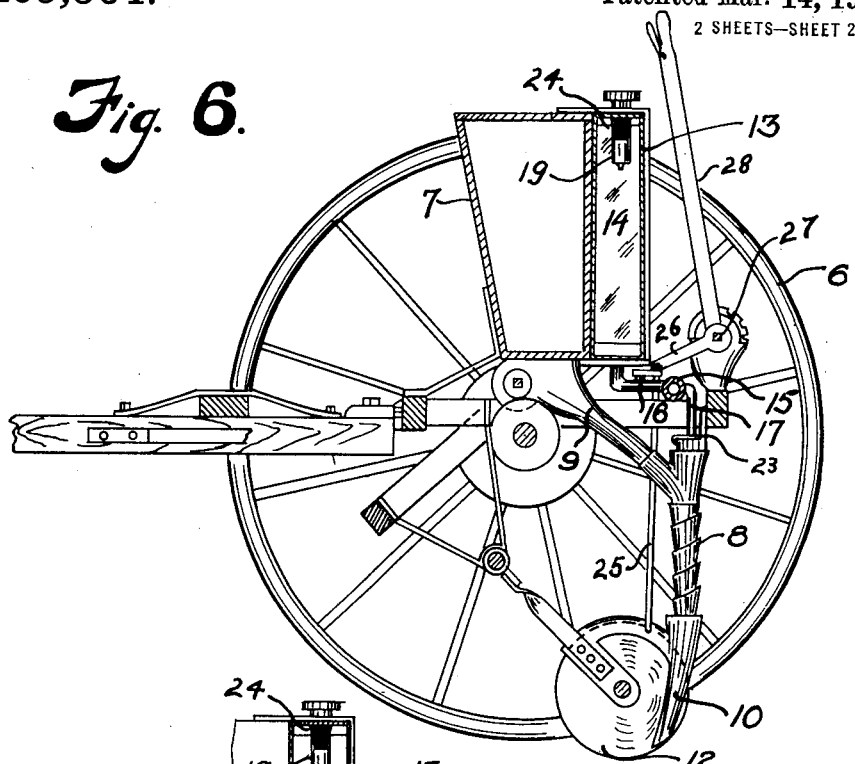
Fig. 6.
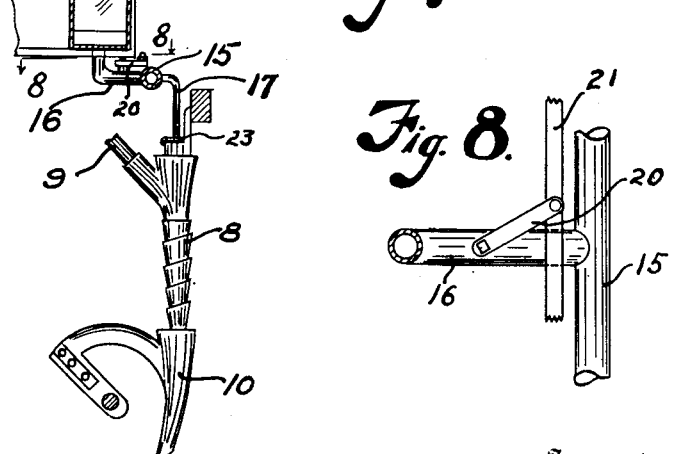
Fig. 7.
Fig. 8.

JOHN H. MITCHELL, OF PRICE CREEK, COLORADO.

ANTISMUT GRAIN AND SOIL TREATING PROCESS AND APPARATUS.

1,409,564. Specification of Letters Patent. Patented Mar. 14, 1922.

Application filed April 8, 1919. Serial No. 288,594.

*To all whom it may concern:*

Be it known that I, JOHN H. MITCHELL, a citizen of the United States, residing at Price Creek, county of Moffat, and State of Colorado, have invented certain new and useful Improvements in Antismut Grain and Soil Treating Processes and Apparatus; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a process and means for treating grain and the soil in which it is sown or planted, to prevent the crop from containing smut. Under present conditions, particularly in the West, and in the absence of the taking of special precautions, a great deal of smut appears in the crops of the various cereals, and the object of my invention, as just stated, is to overcome this difficulty as far as possible, and to a greater extent than has heretofore been accomplished.

The precautions heretofore taken to prevent the appearance of smut in the crops of cereals, so far as I am aware, have consisted in the soaking of the seed in anti-smut solutions, as formalin. This soaking of the grain before planting is effective to some extent, but notwithstanding, there appears a large percentage of smut in crops resulting from the planting of the soaked seed. The novel feature of my process consists in the simultaneous spraying of the grain and the soil during the planting or seeding operation, whereby not only the seed is subject to the action of the anti-smut liquid, but the soil in which the seed is planted is also subjected thereto.

I have found that, notwithstanding all precautions taken so far as they are limited to the treatment of the seed alone, much smut appears in the crop due to the fact that the smut germ is present in the soil where the grain is planted, and hence is taken up by the stalk and communicated to the head, while the latter is in process of fruition. This discovery has led me to adopt the process set forth in this application.

In the drawing I have illustrated a suitable attachment for spraying the grain and the soil as the grain is delivered thereto, this attachment being shown in connection with an ordinary grain drill, though it must be understood that the apparatus may be mounted or connected with any construction of seeder, since the practice of the process is not limited to its use with any specific apparatus, so long as provision is made for spraying the anti-smut liquid upon the seed as it is about to enter the ground, whereby it becomes practicable to spray both the seed and the soil at the same time.

In the construction illustrated, suitable tanks are mounted on the grain drill or seeder, these tanks being in communication with a conduit from which lead downwardly a number of spouts, corresponding with the number of hollow teeth with which the grain drill is provided, the spouts for the anti-smut liquid being arranged within the hollow teeth or conduits through which the grain passes to the soil, these grain conduits being suitably connected with a receptacle of ordinary construction within which the said grain is deposited.

Having briefly outlined the invention, I will proceed to describe the same more in detail, reference being made to the accompanying drawing, in which, as heretofore indicated, is disclosed one form of construction for practicing the process. In this drawing:

Fig. 1 is a rear view of a grain drill equipped with suitable apparatus for applying an anti-smut liquid to the grain and soil simultaneously.

Fig. 2 is a detail view on a larger scale, illustrating one of the tanks and its attachments viewed in the same direction as Fig. 1.

Fig. 3 is a top plan view of the construction shown in Fig. 2.

Fig. 4 is a sectional view taken through one of the hollow grain-guiding teeth of an ordinary drill, shown on a larger scale than in the other views.

Fig. 5 is a detail view of a nozzle located at the lower extremity of each of the liquid-delivering spouts.

Fig. 6 is a cross section of a drilling machine or seeder, equipped with my improvement.

Fig. 7 is a detail view, illustrating the features with which I am most concerned in the practice of the invention.

Fig. 8 is a section taken on the line 8—8, Fig. 7, looking downwardly, the parts being shown on a larger scale.

The same reference characters indicate the same parts in all the views.

Let the numeral 5 designate an ordinary grain drill or seeder, considered in its entirety, the same being mounted on ground wheels, 6, and provided with a grain box, 7, and hollow teeth, 8, which are connected as shown at 9 with the box whereby the seed grain passes from the box into the hollow teeth and thence into the earth, the points 10 of the teeth coming in contact with the soil, discs 12 being employed for covering the grain as it is deposited. This is a grain drill or seeder of ordinary construction. So far as the apparatus of my invention is concerned, as disclosed in the drawing, I mount two tanks, 13, on the framework of the machine, each tank having a number of baffles or partitions, 14, which terminate a short distance above the bottom of the tank so that the compartments are in communication with one another. These baffles have a tendency to maintain the liquid in a stable or quiet condition and prevent it from quickly flowing from one end of the tank to the other, where the surface of the field is inclined. Arranged below each of these tanks is a horizontally disposed conduit, 15; which is in communication with the tank by means of short pipes, 16.

Leading downwardly from the conduit, 15, is a number of spouts, 17, which pass through the hollow teeth, 8, of the seeder and are relatively small, whereby they do not interfere with the passage of the grain through the said teeth. The lower extremity of each of these spouts is equipped with a spray nozzle, 18, which is located just above the point 10 of the tooth, so that the liquid as it issues from the nozzle is deposited upon the grain and the soil or earth in which it is planted, simultaneously. Any suitable means may be employed for turning on and cutting off the supply of liquid to the spout 17.

From this description, it will be understood that the grain to be planted will be placed in its normal condition in the box 7, while the anti-smut liquid, as formalin, will be placed in the tanks 13. Then, as the machine is driven across the field, the grain passes through the hollow teeth of the drill simultaneously with the passage of the liquid through the spouts 17 of my attachment, and consequently, as the seed is about to enter the earth at the lower extremities 10 of the hollow teeth, the liquid is applied to the grain and also to the earth, thus giving the seed and earth at the same time a treatment with the anti-smut liquid compound.

Each of the tanks 13 is provided with an air pump, 19, in order to subject the liquid in the tank to the necessary pressure and to insure an even feed. Each of the pipes 16 contains a cutoff valve operated by a crank arm 20, all of the crank arms being connected with a rod 21 which is pivotally connected with the crank arm as shown at 22. When it is desired to cut off the flow of liquid, the rod 21 is actuated sufficiently for the purpose, the said rod being provided with a handpiece 22.

Each of the spouts 17 is composed of a flexible hose pipe and is connected with the hollow tooth 8, as shown at 23, so that as the tooth and disc are raised, the flexible spout will also be carried upwardly, whereby the upper part of the hose pipe will bend as indicated by dotted lines in Fig. 4.

Each tank is provided with a strainer inlet 24, in order to prevent foreign matter from entering the tank and to prevent the possibility of clogging the outlet 16 between the bottom of the tank and the conduit 15.

In order to raise the discs 12, each disc is connected by means of a rod 25 with a crank arm 26, the latter being secured to a rock shaft 27. The lower extremity of a lever arm 28 is also connected with the said shaft and readily accessible to the person in charge of the machine.

I claim:

1. The herein described seeding process, consisting in simultaneously applying an anti-smut compound to the seed and the soil in which the seed is being planted.

2. The herein described seeding process, consisting in dropping seed and simultaneously spraying the seed as it falls and the soil into which it falls with an anti-smut liquid.

3. The herein described seeding process, consisting in dropping seed and spraying the seed as it drops to the ground, with an anti-smut liquid.

4. A seeder attachment, consisting of an anti-smut liquid-containing tank, means for placing the liquid under pressure, means for taking the liquid from said tank and spraying means for spraying the liquid on the seed as it is conducted to the earth by the seeder.

5. In combination, a seeder having a seed box, hollow teeth for taking the seed from the box, and a seeder attachment, comprising an anti-smut liquid-containing tank, and spraying means within the lower ends of said hollow teeth for spraying the seed with said liquid as it is conducted to the earth by the teeth.

6. The combination in a seeder, of a seed box, hollow teeth in communication with said box for conducting the seed to the earth, an anti-smut liquid tank carried by the seeder, and spraying spouts in communication with the said tank and arranged to spray the seed with such liquid as it enters the earth.

7. The method of treating seed while being planted, consisting in spraying with a liquid fungicide, the seed while in transit from a source of supply to the ground.

8. A planting device, comprising a source of supply, a conduit leading therefrom to the ground, a seed-feeding mechanism for feeding seeds from said source of supply to said conduit, and means for spraying the seed while in motion with a liquid fungicide.

In testimony whereof I affix my signature.

JOHN H. MITCHELL.